United States Patent [19]

Dombrovsky et al.

[11] Patent Number: 4,724,415
[45] Date of Patent: Feb. 9, 1988

[54] LEVEL MEASURING PROBES

[75] Inventors: Daniel S. M. Dombrovsky, La Garenne Colombes; Jean-Michel F. Lanson, Bonnieres s. Seine; Bernard A. Mouchet, Paris, all of France

[73] Assignee: Jaeger, Levallois-Perret, France

[21] Appl. No.: 57,664

[22] Filed: Jun. 9, 1987

Related U.S. Application Data

[63] Continuation-in-part of Ser. No. 651,786, Sep. 18, 1984, abandoned.

[30] Foreign Application Priority Data

Sep. 21, 1983 [FR] France .................. 83 14990

[51] Int. Cl.⁴ .......................................... H01C 7/00
[52] U.S. Cl. ........................................ 338/13; 338/27; 338/229
[58] Field of Search ................ 338/13, 25, 27, 28, 338/229; 73/304 R, 295; 340/59, 603, 604, 620

[56] References Cited

U.S. PATENT DOCUMENTS 4,277,773  7/1981  Blatnik .................. 340/59
4,350,968  9/1982  Tokarz .................. 338/13

FOREIGN PATENT DOCUMENTS 0009252  of 1979  European Pat. Off. .
3117957  of 1982  Fed. Rep. of Germany .
80/00191 of 1980  PCT Int'l Appl. .
2094983  of 1982  United Kingdom .

Primary Examiner—E. A. Goldberg
Assistant Examiner—M. M. Lateef
Attorney, Agent, or Firm—Thomas J. Greer, Jr.

[57] ABSTRACT

A level measuring probe for a liquid contained in a reservoir of the type having a detecting element constituted by a conductor having a high temperature coefficient and intended to be immersed in the liquid; and an electrical connection means intended to permit connection of the said detector element to a connector; a plurality of printed circuits disposed in respective parallel strips are provided on an insulating substrate, the assembly forming a flexible film and each circuit having a detecting zone and an electrical connection zone; the film is assembled to a support of, for example, stainless steel; the assembly is out at the edges of the parallel strips.

3 Claims, 4 Drawing Figures

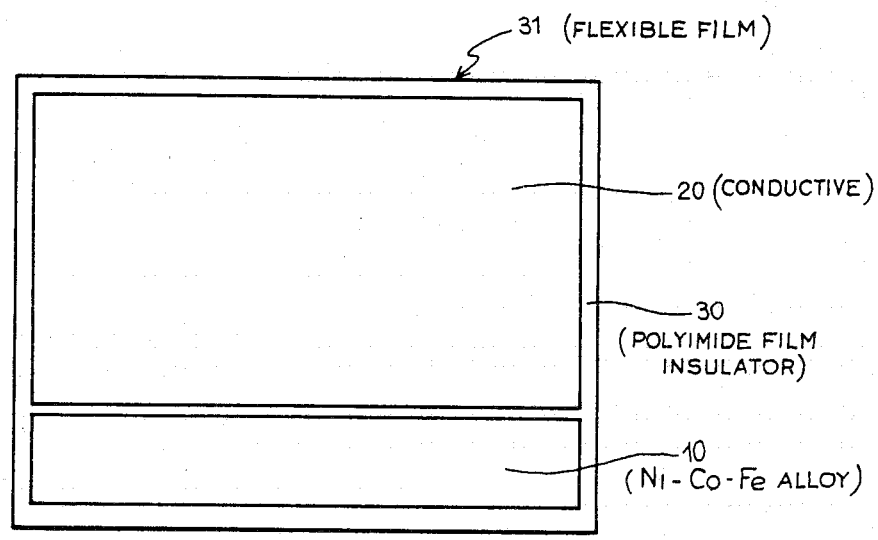
FIG_1
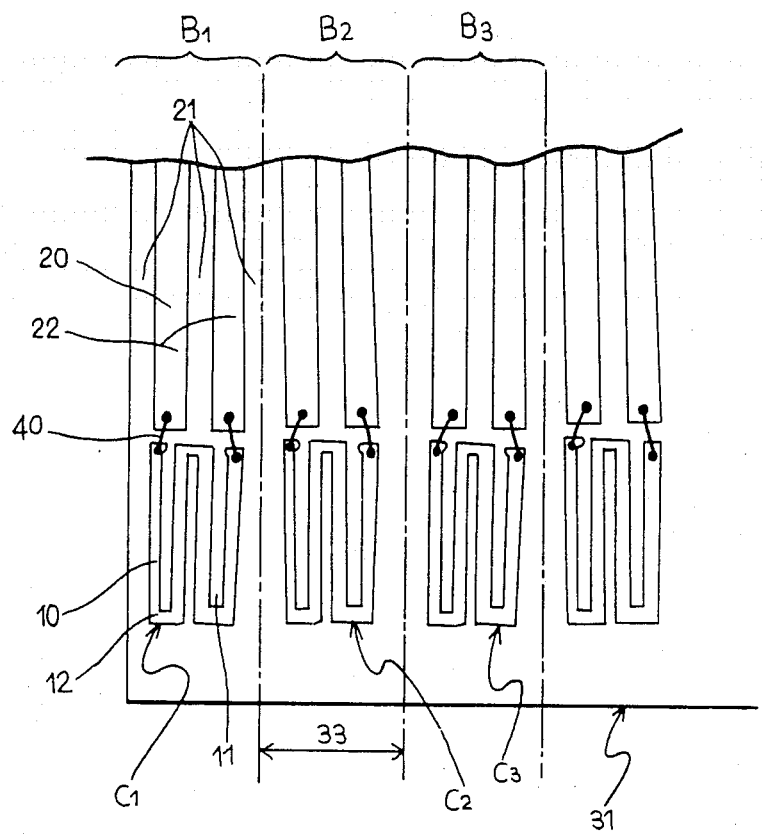
FIG_2

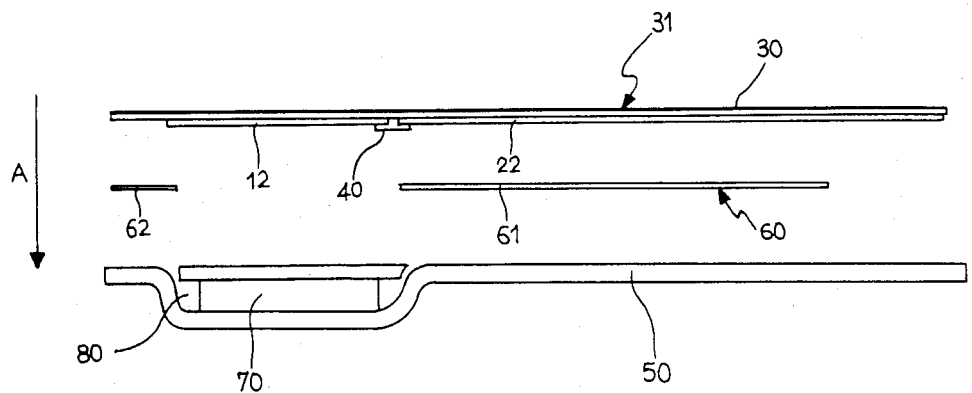
FIG_3
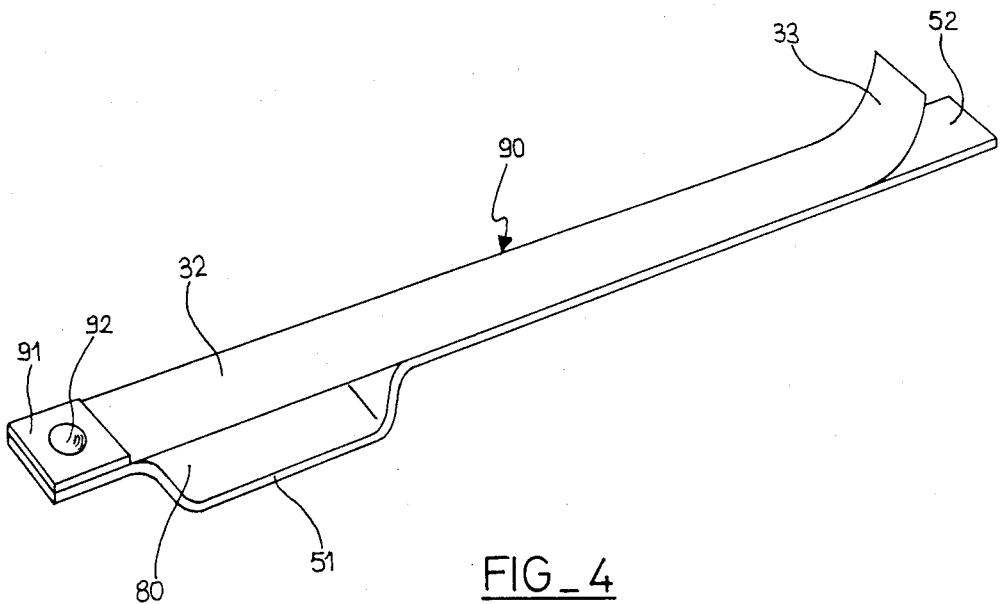
FIG_4

LEVEL MEASURING PROBES

This application is a continuation-in-part of Ser. No. 651,876, filed Sept. 18, 1984, now abandoned.

BACKGROUND OF THE INVENTION

The present invention relates to level measuring probes for measuring the level of a liquid contained in a reservoir, for example a motor vehicle reservoir.

More precisely, the invention relates to probes having a detector element constituted by a resistive conductor having a high temperature coefficient intended to be immersed in the liquid, and connection means connecting this element to a relatively long connector.

The measurement principle of such probes is simple: a resistive metallic element having a high temperature coefficient has its resistance substantially increased as a function of its temperature. On the other hand, when such a resistive element is immersed in a liquid, its resistance depends on the level of the liquid, since the part of the resistive element disposed above the liquid, and thus exposed to the air, is much less cold than the immersed part. In these conditions, the placing of such an element in an electric circuit supplying the detector provides a level measuring means.

By way of example, a particular circuit is described in French patent application No. 76 30 120 of Oct. 6, 1976, published under the French Pat. No. 2,367,276 in the name of Jaeger.

Two constructions of probe are presently available on the market.

One construction presents, as a detector element, a wire of resistive material having a high temperature coefficient wound in a spiral and as a conducting element two copper connecting wires, these wires being respectively protected by a cap and a semi-rigid sleeve connected the one to the other by a screw system.

The other construction, like that described in French patent application No. 82 04050 published under French Pat. No. 2,501,860, in the name of Jaeger, has a detecting strip disposed on a substrate, forming a printed circuit and connected by connection wires to a processing circuit. Such a construction, as previously described requires means for protecting the printed circuit as well as connection wires.

The cost price of these probes is relatively high because the method of manufacture dictated by the components involves individual manual assembly.

Further, the components used occupy a negligible space which on account of the small space available in use, represents a certain inconvenience.

SUMMARY OF THE INVENTION

The object of the invention is to remedy these inconveniences. For this we propose a new probe structure as well as a new method of manufacture.

The new probe according to the invention has a flat elongated support on which is fixed a printed circuit presenting on the same substrate tracks of two materials, both having a high coefficient of temperature, for forming from one part the detecting element and from the other part the connection means. The detecting element is made of resistive material having a high resistivity coefficient while the material forming the electrical connection of the probe substantially made of copper clad has a low resistivity coefficient.

For producing such a probe, we propose in addition a method of manufacture according to which:

associating to a single substrate two adjacent conducting layers of different materials, both having a high coefficient of temperature, for forming a detecting zone and a connection zone;

etching simultaneously said two zones in order to obtain two tracks of printed circuit with the aid of a mixture of chemical agents, the proportions and concentrations of these chemical agents permitting adjustment of the speeds of etching of each said zone as a function of their composition and thickness;

providing in this manner a plurality of printed circuits disposed in respective parallel strips, each said circuit having a detecting track and two electrical connection tracks; and assembling the thus produced film onto a flat elongated support, and cutting it at the edge of said parallel strips to obtain a plurality of probes.

This new construction of the probe as well as its method of manufacture permits, because they eliminate use of connection wire for connecting the detecting element to a connector and they allow mass production not requiring manual operations, significant lowering of the unit cost price of each probe.

Other characteristics and advantages of the invention will appear from the following description and the accompanying drawings.

BRIEF DESCRIPTION OF THE DRAWINGS

In the drawings, FIGS. 1, 2, 3 and 4 illustrate different phases of manufacture of the probes in a preferred embodiment given by way of example; on all the figures the same references designate the same elements. More precisely:

FIG. 1 is a view from above of a substrate with the conductive layers forming the detection and connection zones;

FIG. 2 shows in a view similar to that of FIG. 1, the arrangement of printed circuits;

FIG. 3 shows a side view of the assembly of the film and of the support; and

FIG. 4 shows in perspective, a probe in accordance with the invention obtained by cutting of the above assembly.

DESCRIPTION OF THE PREFERRED EMBODIMENT

In accordance with the invention, and as shown in FIG. 1, a flexible film 31 is produced by associating to an insulating substrate 30 a layer 10 of a detecting conductive element, having a resistance with a high coefficient of temperature, and a layer 20 of a conducting element for electrical connection.

In a typical example, the substrate 30 is a thin polyimide film of 50 $\mu$m thickness, the layer 10 is of a nickel-cobalt-iron alloy and has a thickness of 17 $\mu$m and the layer 20 is of copper and has a thickness of 30 $\mu$m.

The assembly of these elements (10, 20, 30) is made by heating and pressing, whilst interposing between the substrate 30 and the layers 10 and 20 a thin acrylic layer forming a bond. One obtains a flexible film 31 having two adjacent zones 10 and 20.

One then arranges on this film 31 a thin photosensitive layer covering the zones 10 and 20. This layer is exposed via a mask reproducing the design of printed circuits to be achieved with the necessary repetition pitch 33.

As shown in FIG. 2, the zones 21 and 22 not protected by the mask, representing the two detecting and connection zones 10 and 20, are chemically etched away. This etching brings about simultaneous attack of two chemical agents, nitric acid and iron chloride, of which the concentrations and proportions permit adjustment of the speed of etching of the detecting zone 10 and connecting zone 20 as a function of their respective composition and thickness in order to obtain etching away of all the non-protected zones at substantially the same time.

As can be seen on FIG. 2, one finally obtains a plurality of printed circuits $C_1, C_2, C_3 \ldots$ arranged in parallel strips $B_1, B_2, B_3 \ldots$, each circuit having a detecting part 12 and a connection part 22. In the embodiment shown, the detecting part 12 of each circuit $C_1, C_2, C_3 \ldots$ is in the form of a track presenting multiple slots between the contacts 13 and 14, and the connection part 22 is in the form of two parallel tracks terminating in contacts 23 and 24. The detecting parts 12 and the connecting parts 22 of each circuit $C_1, C_2, C_3 \ldots$ are associated by connecting soldered wires between the contacts 13 and 23 and between the contacts 14 and 24.

As shown in FIG. 3, the film 31 is then associated with a support plate 30 of stainless steel sheet having a thickness of 0.8 mm. This plate 50 presents in its part facing the detecting part 12 a groove 80, for avoiding contact between the said detecting part 12 and the plate 50. A bonding element (a thin acrylic layer) 60 is arranged on either side (regions 61 and 62) of the said groove 80 between the plate 50 and the film 31. The assembly is made by pressing in the direction of arrow A, the face of the film 31 having the detecting parts 12 and the connecting parts 22 being applied towards the plate 50.

The assembly obtained is then cut along the edges of each circuit $C_1, C_2, C_3 \ldots$ with the aid for example of a laser. One thus obtains a plurality of probes.

FIG. 4 shows the probe finally obtained. It comprises a strip 33 of flexible film 31 having a detecting part 12 and a connection part 22, associated with a support 52 resulting from cutting of the plate 50. The probe presents, in the region corresponding to the detecting part 12, a groove 80, the support 52 and the band 33 forming respectively at this level a bow 51 and a cord 32 permitting circulation of liquid in the said groove 80. All thermal effect between the detecting part 12 and the support 50 or possible drops of liquid, held by capillary action between the bow 51 and the cord 32, is thus avoided. The cord 32 at the lower end of the probe 90 is fixed to the bow 51 by a plate 91 and a rivet 92; the strip 33 is left free at the upper end of the probe 90 in order to facilitate access to the connection part 22 for electrical connection or disconnection.

It should be noted that the invention is not limited to the above described embodiment, but extends to all variants comprised in its spirit.

In particular the design of the detecting part 12 is not limitative; this configuration in slots is only an example which has the advantage of increasing the sensitivity of the resistive element having high temperature coefficient, which has a sensitivity which increases as a function of its length.

Similarly, the means of connection by the contacts (13, 23; 14, 24) of the detecting and connection parts is not limitative; the soldered wires can be replaced by silk screen printing, by bonding or other means.

The probe of the invention is particularly applicable to detection of the level of reservoirs in automative vehicles, notably the oil reservoir contained in the engine casing.

We claim:

1. A level measuring probe for a liquid contained in a reservoir of the type having a detecting element constituted by a conductor having a high coefficient of temperature which in operation is normally immersed in the liquid, and electrical connection means permitting connection between said detectingelement and a connector, the improvement comprising, an elongated flat support, and a printed circuit film fixed on said support, said printed circuit film incorporating a single insulating substrate, and electrical paths defined by two materials on the substrate, both having a high coefficient of temperature, with one having a high coefficient of resistivity and the other a low coefficient of resistivity, for forming said detecting element and said means for electrical connection of the probe.

2. A probe according to claim 1, wherein said support has a part situated opposite said detecting element, said part having a groove receiving said detecting element and defining a detection zone, the support and the film forming, respectively at said groove, a bow and a cord, said bow and cord avoiding thermal effects between said support and said detecting zone, and avoiding a possible drop of liquid held by capillary action between said bow and said cord.

3. A probe according to claim 2 wherein said cord is at the lower part of said probe fixed to said bow by a plate and a rivet.

* * * * *